Figure 1:
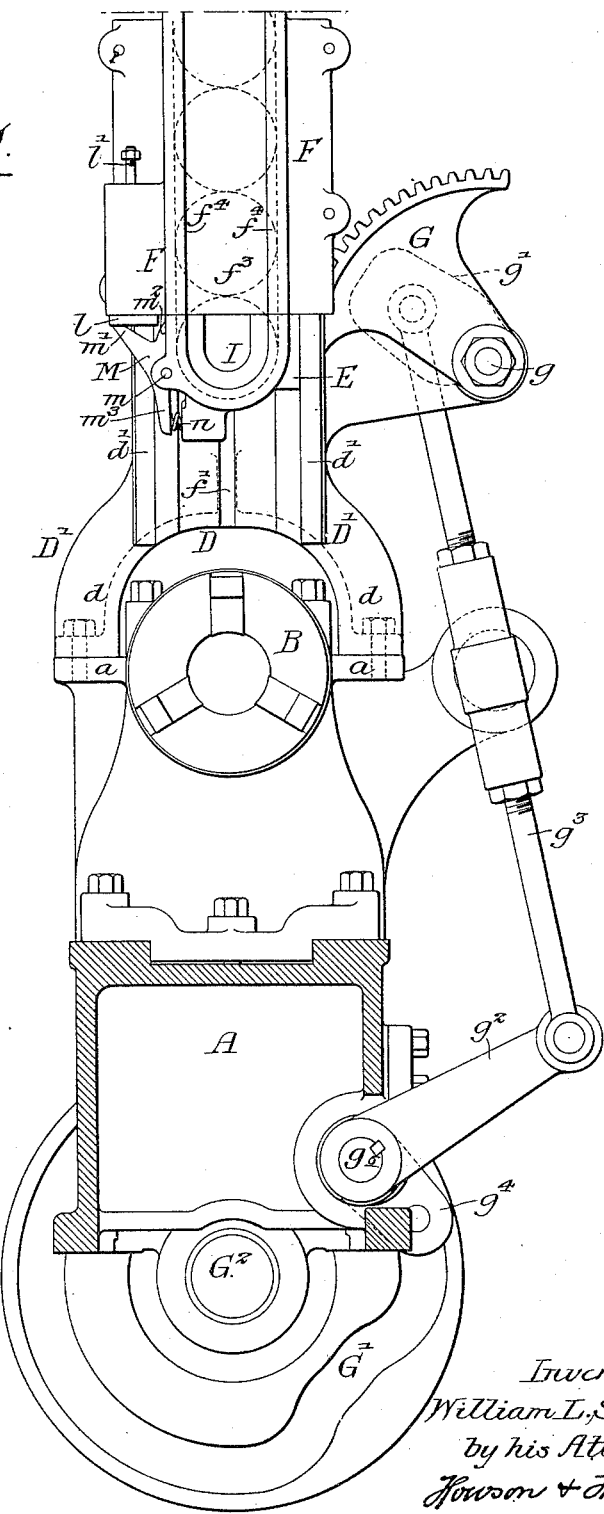

No. 667,994. Patented Feb. 12, 1901.
W. L. SCHELLENBACH.
FEEDING MECHANISM FOR TURRET LATHES.
(Application filed Aug. 2, 1900.)
(No Model.) 4 Sheets—Sheet 1.

Witnesses:
Frank L. G. Graham.
Chas. W. Eber.

Inventor:
William L. Schellenbach
by his Attorneys.
Howson & Howson

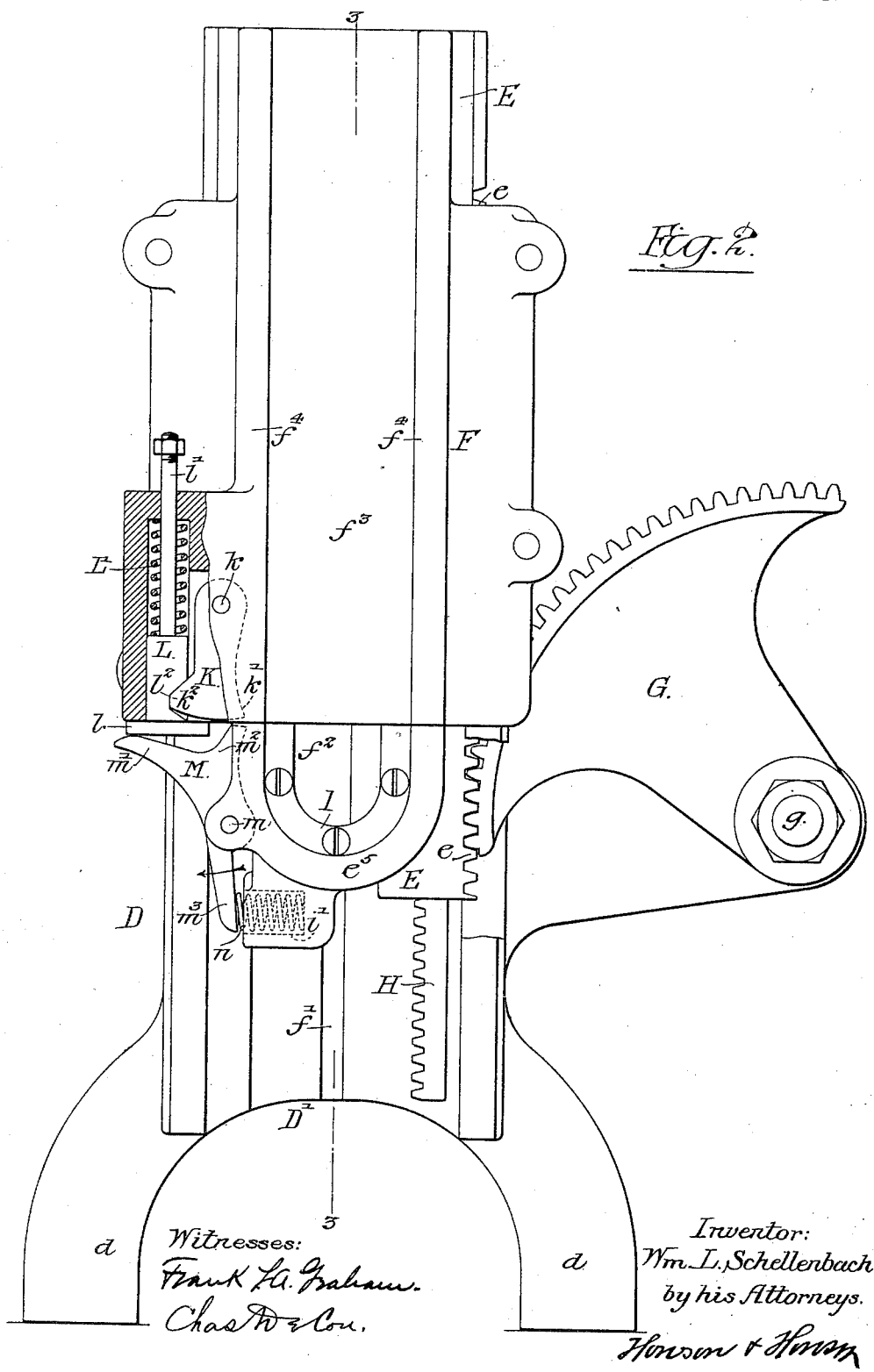

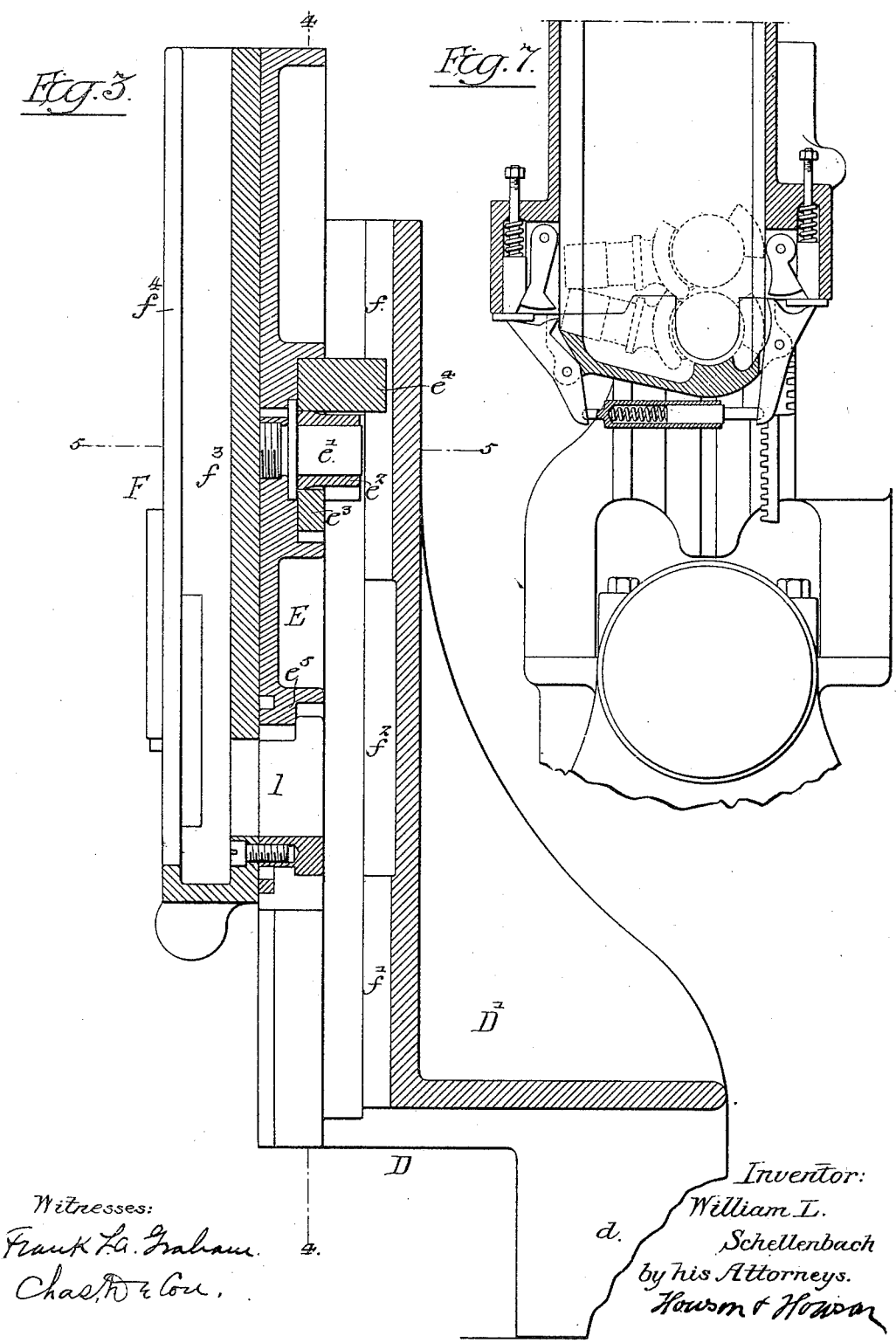

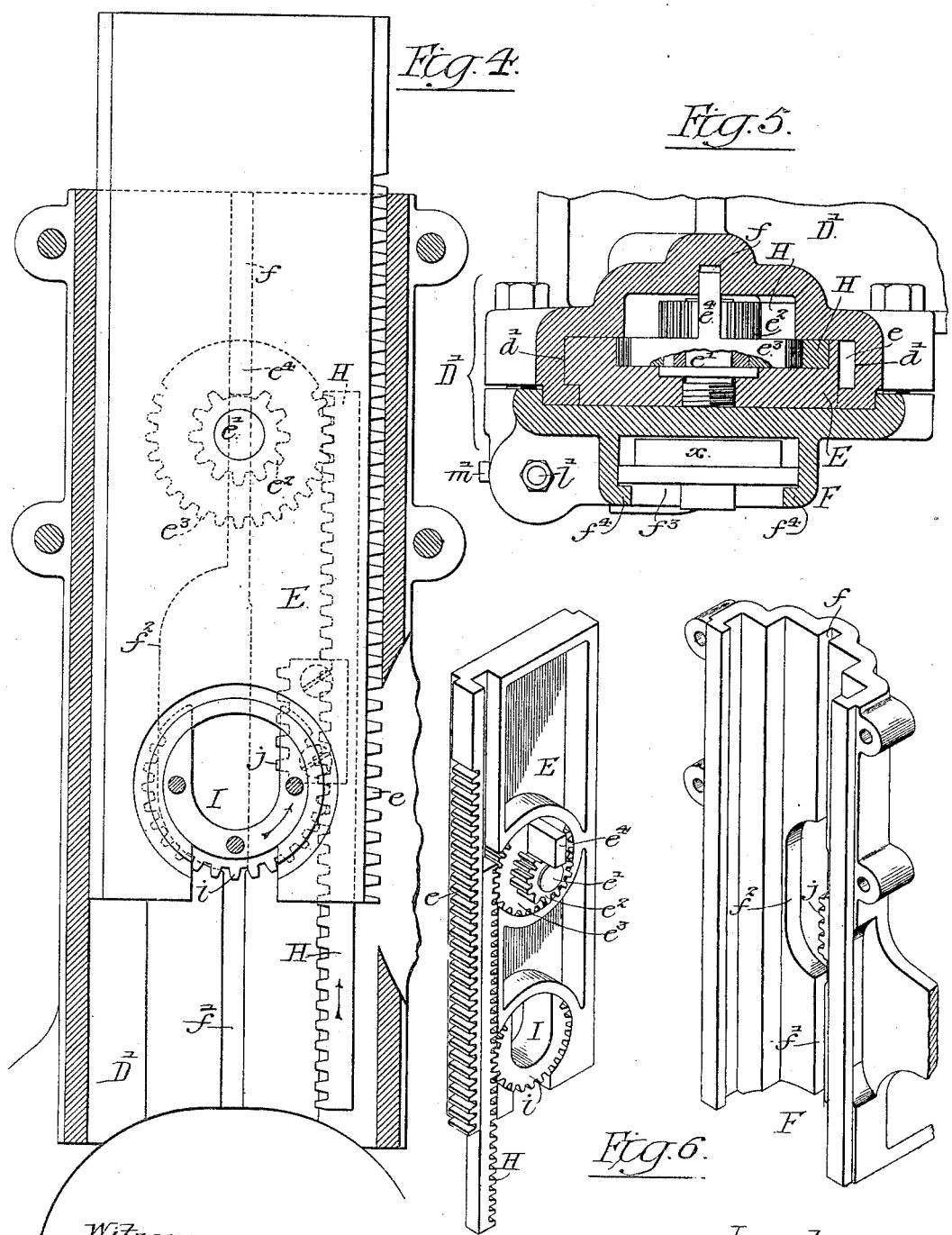

UNITED STATES PATENT OFFICE.

WILLIAM L. SCHELLENBACH, OF CINCINNATI, OHIO, ASSIGNOR TO THE ENTERPRISE MANUFACTURING COMPANY OF PENNSYLVANIA, OF PHILADELPHIA, PENNSYLVANIA.

FEEDING MECHANISM FOR TURRET-LATHES.

SPECIFICATION forming part of Letters Patent No. 667,994, dated February 12, 1901.

Application filed August 2, 1900. Serial No. 25,697. (No model.)

*To all whom it may concern:*

Be it known that I, WILLIAM L. SCHELLENBACH, a citizen of the United States, and a resident of Cincinnati, Ohio, have invented certain Improvements in Feeding Mechanism for Turret-Lathes, of which the following is a specification.

The object of my invention is to so construct the hopper of an automatic lathe that the blanks to be cut can be accurately fed to the chuck of the lathe one at a time.

By my invention I can use a fixed hopper, placing it directly above the chuck of the lathe, and a carrier for transferring the blank from the hopper to the chuck.

In the accompanying drawings, Figure 1 is a front view of my improved hopper with the frame of an automatic lathe in section. Fig. 2 is an enlarged view of part of Fig. 1 and partly in section. Fig. 3 is a section on the line 3 3, Fig. 2. Fig. 4 is a section on the line 4 4, Fig. 3. Fig. 5 is a sectional plan view on the line 5 5, Fig. 3. Fig. 6 is a detached perspective view of parts of the mechanism, and Fig. 7 is a view of a modification.

Referring in the first instance to Fig. 1, A is the frame of an automatic lathe. B is the chuck, which is to receive the article from the hopper. D is a hopper mounted directly above the chuck B in the present instance and supported on the bearings $a$ for the chuck-spindle. The supporting-frame D' is preferably provided with feet $d\,d$, which are secured to the bearings $a$.

Mounted in guides $d'$ in the frame D is a slide E. In front of the slide and secured to the frame D' is a cap-plate F, having a channel $f^3$ for the blanks to be fed to the chuck of the lathe. The channel is preferably open in front, the blanks being held in place by a flange $f^4$. On one edge of the slide is a rack $e$, with which mesh the teeth of a segment G, pivoted to a shaft $g$, mounted in bearings projecting from the frame D'. On this shaft is an arm $g'$, connected to an arm $g^2$ by a rod $g^3$. This arm is on a rock-shaft $g^5$, which has an arm $g^4$, controlled by a cam G' on the driving-shaft G² of the machine. This illustrates one method of operating the discharge mechanism of the hopper. Projecting from the slide is a stud $e'$. Carried by this stud is a broken pinion $e^2$, on the hub of which is a broken gear-wheel $e^3$. Projecting from the rear of the gear-wheel $e^3$ is a lug $e^4$, which travels in the grooves $f\,f'$ in the frame D'. The upper groove $f$ is in line with the lower groove $f'$; but there is an open space $f^2$ between the two grooves, which will allow the lug $e^4$ and its wheel to make a half-revolution. The object of this will be explained hereinafter.

Meshing with the broken gear-wheel $e^3$ is a floating rack H. This rack also meshes with the teeth $i$ of a carrier I, and this carrier is mounted in bearings $e^5$ in the lower end of the slide E.

Secured to the frame D' is a short rack $j$, having teeth which are in line with the teeth of the pinion $e^2$, so that the pinion will engage this rack and travel over it when the slide E reaches a certain point in its movement.

Pivoted at $k$ to the cap-plate is a detent-pawl K. The portion $k'$ of this pawl is projected into the path of the blanks in the hopper when the carrier I is withdrawn from the hopper and retains them during the absence of the carrier.

L is a plunger having a head $l$ and a stem $l'$. Back of the head of the plunger is a spring L', tending to force the plunger down. The plunger is recessed at $l^2$, so as to receive the projecting portion $k^2$ of the detent-pawl K.

Pivoted at $m$ to the frame of the carrier I is a lever M, having an arm $m'$, which presses upon the head of the plunger L, retaining the plunger in the position shown in Fig. 2 when the carrier is up. In this position the pawl K is clear of the articles in the hopper.

The lever M has a detent-arm $m^2$, which holds the article in the carrier, so that when the carrier is turned the article will not fall out. The lever M also has an arm $m^3$, back of which is a spring $n$. This spring rests in the socket $i'$ and tends to force the lever out in the direction of the arrow, Fig. 3.

In some classes of work it will be necessary to place one of the detent-pawls K on the opposite side of the hopper and also to duplicate the lever M. This can be accomplished by the construction shown in Fig. 7. This construction is essential when a very irregular article is to be chucked, as shown in said figure.

The operation of the device is as follows: The lathe is set for the particular article to be cut, and the parts are so timed that the chuck will receive a blank from the hopper as it is presented to it and will discharge it automatically. The blanks are placed in the hopper and the hopper must be kept charged by the operator. An irregular reciprocating motion will be imparted to the slide by the cam G', as there is a considerable dwell during the time the lathe is cutting the chucked blank. The lowermost article in the hopper rests in the carrier I, the others being mounted directly one upon another. The article in the present instance is shown at $x$, Fig. 5, being a circular blank with a flange and a small hub. On the first movement of the segment G and the slide E the lug $e^4$ of the gear-wheel $e^3$ will travel in the upper groove $f$, and when the pinion $e^2$ reaches the point where it meshes with the short fixed rack $j$ the lug will have reached the enlargement $f^2$, allowing both the pinion $e^2$ and the wheel $e^3$ to freely turn. As the wheel $e^3$ meshes with the loose rack H the turning of the wheel will cause the rack to move in the direction of the arrow, Fig. 4, and as this rack meshes with the teeth $i$ of the carrier it will turn the carrier in the direction of the arrow, the carrier having in the meantime drawn away from the bottom of the fixed hopper, so that it can turn without interference. As the carrier and its slide descend the lever M is moved in the direction of the arrow, Fig. 2, so that its arm $m^2$ will project sufficiently to hold the blank in the carrier when the carrier is reversed. The plunger being also relieved will be forced down by its spring, forcing the detent-pawl out in the path of the blanks, holding the remainder of the blanks within the hopper. As the slide descends the pinion $e^2$ will make half a revolution and the lug $e^4$ will be in position to enter the lower slot $f'$ and hold the carrier in proper position to be relieved of the blank. When the carrier has reached its full downward movement, it has a short dwell, the time being sufficient to allow the blank to be grasped by the mechanism of the lathe and carried into the chuck. As soon as the mechanism grasps the blank the slide E returns and the spring-arm M yields, freeing itself of the blank. As the carrier returns it is reversed by the pinion $e^2$ coming again in contact with the fixed rack $j$. The carrier will then be reversed a half-turn, and the lug $e^4$ will enter the upper groove $f$. The arm $m'$ of the lever M will strike the head of the plunger L, forcing it up against the pressure of its spring, and the weight of the blanks will force the detent-pawl into the recess $l^2$ of the plunger, allowing the lowermost blank in the hopper to drop into the carrier, when the above operation will be repeated.

I claim as my invention—

1. The combination in feed-hoppers for automatic lathes, of a hopper, a carrier arranged to receive a blank from the hopper, and then to move away bodily from said hopper, and means for turning the carrier during and in addition to its travel from the hopper to a position in front of the chuck of the lathe, substantially as described.

2. The combination of a hopper, a carrier arranged to receive a blank from the hopper, a chuck, means for moving the carrier bodily from the hopper to a point in front of the chuck, and other means for turning the carrier one-half a revolution and locking it in its two positions, substantially as described.

3. The combination of a hopper, a chuck, a slide, means for reciprocating said slide, a carrier mounted in bearings on the slide and arranged under the hopper so as to receive a blank therefrom, and means for turning the carrier, substantially as described.

4. The combination of a hopper, a slide, means for reciprocating the slide, a carrier mounted on the slide and arranged to receive a blank from the hopper, a detent-pawl on the hopper, a detent-lever on the carrier, and means for turning the carrier as the slide moves away from the hopper, substantially as described.

5. The combination of a hopper, a carrier arranged to receive a blank from the hopper, means for moving the carrier from or toward the hopper, means for turning the carrier during a portion of the stroke, and means for holding the carrier in its two positions before and after it is turned, substantially as described.

6. The combination of a lathe having a chuck, a frame mounted above the chuck, a slide mounted in the frame, means for reciprocating the slide, a pinion and a gear-wheel carried by the slide, a lug on the gear-wheel traveling in the upper and lower slots in the frame, a fixed rack with which the pinion engages, a loose rack with which the gear-wheel engages, a carrier mounted on the slide having teeth meshing with the loose rack so that as the slide travels toward the chuck the carrier will be turned, substantially as described.

7. The combination of a chuck, a frame mounted above the chuck, a slide mounted in said frame, means for moving the slide toward and from the chuck, a stud on the frame, a pinion, and a gear-wheel secured together and mounted on the pinion, a lug on the gear-wheel, the frame having grooves in which the lug travels, the frame being cut out between the upper and lower grooves to allow the pinion and gear-wheel to turn, a loose rack with which the gear-wheel engages, a carrier mounted on the slide and having teeth meshing with the loose rack, said carrier arranged to receive a blank from the hopper, a detent on the carrier, and a detent on the hopper so arranged that when the carrier draws away from the hopper the detent of the hopper will prevent the blanks in the hopper from dropping and the detent on the carrier will hold the blank in the carrier when the carrier is reversed, substantially as described.

8. The combination of a feed-hopper, a carrier, a rack controlling the movement of the carrier, a segment gearing with said rack, a driving-shaft, a cam on the driving-shaft, a rock-shaft having an arm engaging the cam, and an arm connected to the gear-segment, substantially as described.

9. The combination of a feed-hopper, a carrier, a rack controlling the movement of the carrier, a segment, a shaft on which the segment is secured, an arm on the shaft, a driving-shaft, a cam on the driving-shaft, a rock-shaft having two arms, one of said arms being controlled by the cam and the rod connecting the other arm with the arm of the gear-segment, substantially as described.

In testimony whereof I have signed my name to this specification in the presence of two subscribing witnesses.

WILLIAM L. SCHELLENBACH.

Witnesses:
CHARLES F. DALY,
WM. T. MCCULLOUGH.